June 25, 1929.  E. G. OAKLEY  1,718,662

TIRE VALVE

Filed June 5, 1925

Inventor
Erastus G. Oakley
By Henry E. Rockwell
Attorney

Patented June 25, 1929.

1,718,662

UNITED STATES PATENT OFFICE.

ERASTUS G. OAKLEY, OF SOUTHPORT, CONNECTICUT, ASSIGNOR TO BRIDGEPORT BRASS COMPANY, OF BRIDGEPORT, CONNECTICUT.

TIRE VALVE.

Application filed June 5, 1925. Serial No. 35,203.

This application relates to tire valves and more particularly to an improved tire valve stem or shell, designed to contain the valve proper or valve inside which is mounted within the stem and adapted to control the admission of air to and venting it from the tire.

Such valve stems generally consist of a tubular body portion, provided at one end with a relatively broad flat disk-like head or base, designed to be placed within the inner tube of the tire and having at the other end a reduced portion or neck within which the valve inside is secured and which receives the usual valve cap. In the past, such stems have usually been made from a piece of solid bar stock the air passage therethrough being formed by drilling a hole through the piece of stock and enlarging the passage at one end to form a shoulder upon which the valve spring shoe, usually employed in connection with a valve inside, may seat. In such a construction, the exterior diameter of the valve stem must be of a certain standard size to conform to the requirements of tire manufacturers, and as the drilled air passage through the stem is relatively small, the wall of the stem is comparatively thick and hence the stems are heavy and contain a much greater amount of material than is required to withstand the strains to which they are subjected. As the material usually used is brass or some non-corrosive substance, it is relatively expensive and hence if the stem were made of the proper size with a relatively thin wall, a considerable saving would be effected.

In the manufacture of such a thin wall stem, it is necessary to make provision for securing therewithin the usual valve inside, and providing some means to support the valve spring shoe which is a part of the standard valve inside in common use at the present time.

One object of my invention, therefore, is the provision of a valve stem provided with a relatively thin wall and having a housing or cage secured at the upper end thereof to receive the valve inside.

A further object of my invention is the provision of a tire valve stem having a relatively thin wall and a substantially uniform exterior diameter throughout its length, the upper end of the stem being designed to receive a cage or housing for a valve inside, so that a tight connection may be made between these parts and the passage of air through the stem controlled by the valve within the cage.

A still further object of my invention is the provision of a valve cage or housing, designed to be connected to a tire valve stem adjacent the mouth thereof, and so constructed as to provide a trap wherein foreign particles may be caught and retained so that they are prevented from interfering with the normal operation of the valve.

To these and other ends the invention consists in the novel features and combination of parts to be hereinafter described and claimed.

Figure 2:
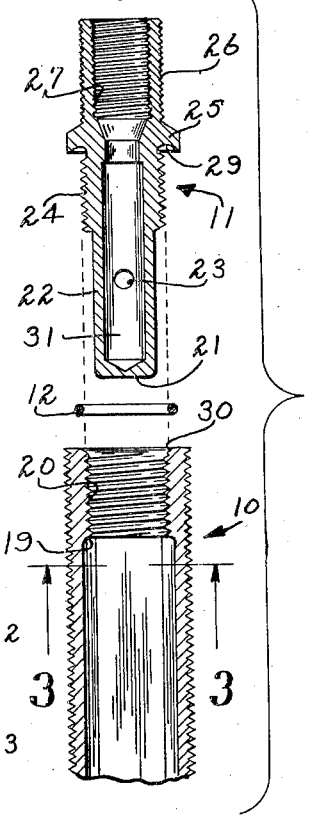
Fig. 2 is a composite view, showing the various parts which constitute the stem.
Figure 3:
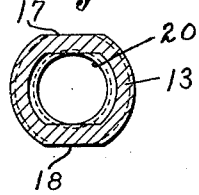
Fig. 3 is a sectional view on line 3—3 of Fig. 2.

The valve stem which I have selected to illustrate and describe as a preferred embodiment of my invention, comprises a hollow or tubular body portion 10, a valve housing or cage 11, and a ring 12 of a sealing material, designed to be inserted at the joint between the cage and stem to effectively prevent any leakage of air therebetween. The body 10 of the valve stem is made of the standard size as far as exterior dimensions are concerned, but the wall 13 is comparatively thin, thus providing a relatively large bore 14 through this portion of the stem. This part of the stem may be made, for instance, by being drawn from sheet metal, as it will be found that the wall of a stem constructed in this manner may be made sufficiently thick to withstand the strains to which it may be subjected, and that with this or a similar method of construction, the cost of the stem may be considerably reduced. Upon the lower end of the stem body is provided the usual disklike head or base 15, which joins the body by a reduced neck portion 16. As shown in Fig. 3, opposite flat sides 17 and 18 are provided upon this portion of the stem, which flattened sides extend substantially to the upper end of the body of the stem on the exterior thereof. As these sides are formed by a flattening of the entire side of the wall of the stem, the shape of the cross section of the bore will correspond to that of the exterior, except that within the stem bore the flat sides terminate a short distance from the upper end of the stem, as, for instance, at the point 19 in Fig. 2. The bore of the stem above this point is circular in shape, thus causing the wall to be thinner opposite the flat sides than upon the rounded sides of the stem, as shown in Fig. 3. This circular bore is threaded, as shown at 20.

The valve cage 11 comprises a cup shaped or hollow cylindrical body, having a closed lower end 21. The lower portion 22 of this cage is of the proper size to freely enter the interior of the body, and leave a clearance space between the flat sides thereof and the cage. Openings 23 are provided in the wall so that air is permitted to pass from the bore of the cage to that of the stem, and hence into the tire. Above the lower portion 22 the cage body is somewhat enlarged and threaded exteriorly, as shown at 24, which threads are designed to engage the threads 20 of the shell. Above the threads 24 is a shoulder portion 25, designed to seat upon the upper edge of the shell body, and above this shoulder is a neck threaded externally as at 26, to receive the usual valve cap, and threaded internally, as shown at 27, to receive the threaded body 28 of the valve inside. This valve inside is preferably of the form shown in my co-pending application, Serial No. 706,689, filed April 15, 1924, and need not be further described herein.

To obviate any possibility of the leakage of air at the joint between the threads 20 and 24, a ring 12 of a sealing material is placed between the lower face of the shoulder 25 and the upper edge of the body 10 of the stem. A shallow recess 29 may be provided in the shoulder 25 to receive this ring, and likewise the inner corner of the upper edge of the stem body may be slightly rounded as at 30 to provide in conjunction with the recess 29 a space to receive this ring.

The ring may be and preferably is made of solder. The parts are assembled by threading the lower portion of the valve cage 11 through the ring 12, and then screwing the cage tightly into the stem body until the shoulder 25 seats closely upon the upper edge of the stem body, with the ring of solder compressed therebetween. The solder is then melted by any preferred method and results in perfecting the seal between the two parts so as to insure against the leakage of air.

It will be apparent that an extremely serviceable and efficient valve stem results which is relatively economically made, due to the fact that the drawing or pressing operation used in its manufacture is inexpensive, and the amount of material used has been greatly reduced in comparison with that used in the prior types of stems. The cage 11 may be drawn or pressed from a sheet or disc of metal, in somewhat the same manner that the stem body itself is made. The provision of the air openings or ports 23 at a position considerably above the lower closed end 21 of the cage, provides a catch basin or trap 31 at the lower end of the cage, which will catch and retain foreign particles entrained in the air passing into or out of the tire, so that such particles will not cling to the valve and interfere with the positive and efficient operation thereof.

Figure 1:
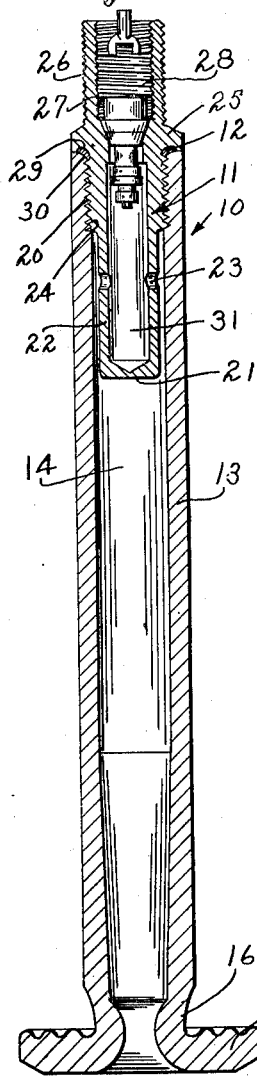
Fig. 1 is a sectional view of a valve stem, embodying my improvements.
Figure 4:
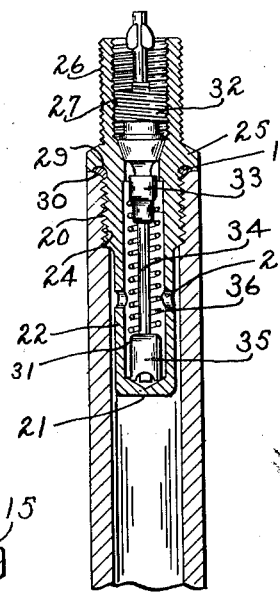
Fig. 4 is a fragmentary sectional view, similar to Fig. 1, but showing a different type of valve inside.

In Fig. 4 of the drawings, I have shown my improved valve stem in connection with a different type of valve inside, which is largely used at the present time. This valve inside is provided with a threaded body portion 32 corresponding to the part 28 in Fig. 1, so that it may be secured within the stem in the same manner. The valve proper 33 is carried upon a stem 34, which passes loosely through a valve spring shoe 35 between which and the valve 33 reacts a spring 36 which surrounds the stem. It will be seen that when this type of valve is used, the valve spring shoe rests upon the bottom 21 of the valve cage, so that a firm support is had for this shoe to insure the proper action of the spring 36 to keep the valve seated.

While I have shown and described a preferred embodiment of my invention, it will be understood that it is not to be limited to all of the details shown, but is capable of modification and variation within the spirit of the invention and within the scope of the appended claim.

What I claim is:

In a tire valve stem having a relatively thin walled hollow body portion of substantially uniform cross-section throughout its length and a valve cage having an upper externally threaded portion adapted to receive a valve cap or the like, and an internal bore adapted to receive a valve insides, the combination of means for permanently securing the cage in the relatively thin walled hollow body portion, said means comprising an externally threaded lower portion on said cage, internal threads in the body of the valve stem in which the lower threaded portion of the cage may be received, a shoulder on said cage projecting laterally beyond the upper and lower threaded portions thereof and opposing the upper edge of the body of the valve stem, said shoulder being provided with a groove, and a ring of solder disposed in said groove and melted after the cage is received in the stem to unite the cage permanently to the stem.

In witness whereof, I have hereunto set my hand this 3 day of June, 1925.

ERASTUS G. OAKLEY.